Sept. 18, 1951 D. R. FITCH 2,568,062
CHAIN SAW GRINDING MACHINE
Filed June 6, 1950 3 Sheets-Sheet 1

INVENTOR.
Dudley R. Fitch
BY
Bean, Brooks Buckley & Bean
ATTORNEYS

Sept. 18, 1951      D. R. FITCH      2,568,062
CHAIN SAW GRINDING MACHINE
Filed June 6, 1950      3 Sheets—Sheet 2
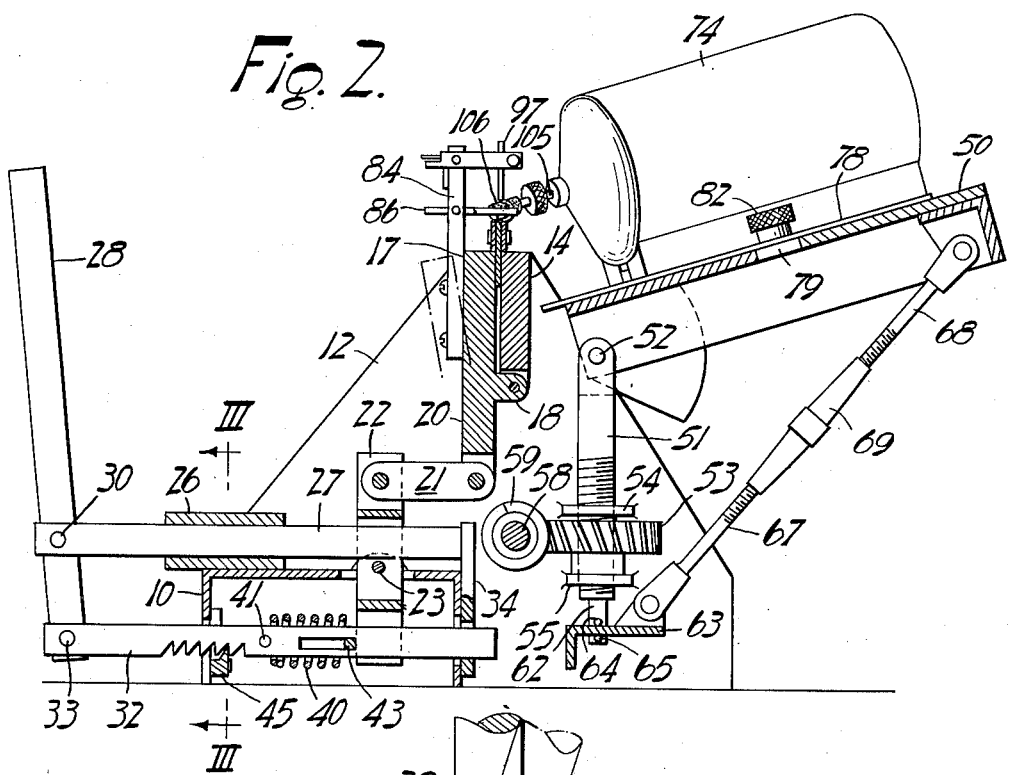
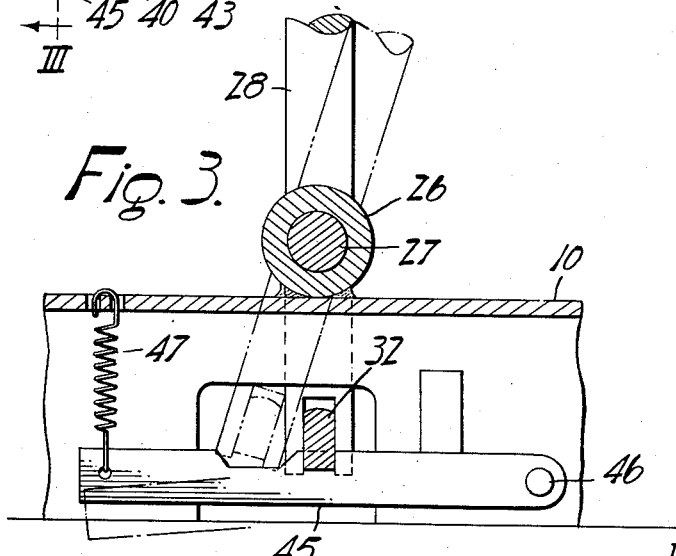
INVENTOR.
Dudley R. Fitch
BY
Bean, Brooks, Buckley & Bean
ATTORNEYS Sept. 18, 1951   D. R. FITCH   2,568,062
CHAIN SAW GRINDING MACHINE
Filed June 6, 1950   3 Sheets-Sheet 3
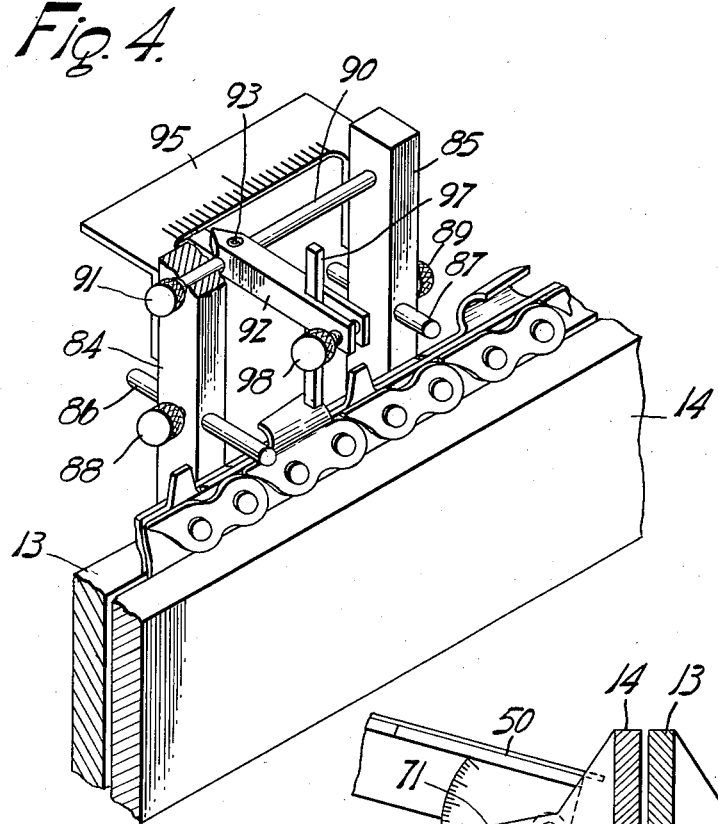
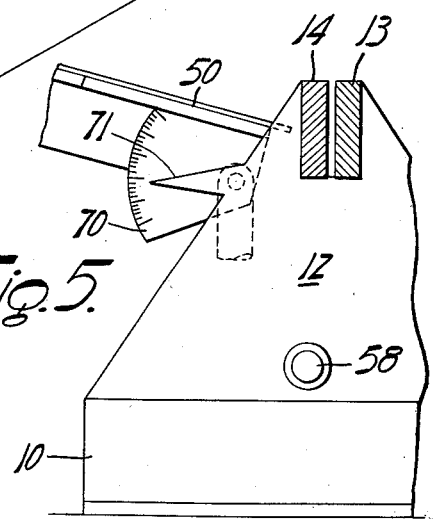
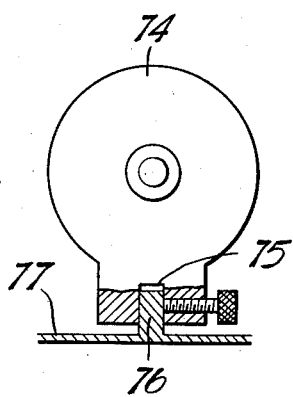
INVENTOR.
Dudley R. Fitch
BY
Bean, Brooks, Buckley & Bean
ATTORNEYS Patented Sept. 18, 1951

2,568,062

UNITED STATES PATENT OFFICE 2,568,062

CHAIN SAW GRINDING MACHINE

Dudley R. Fitch, Ransomville, N. Y.

Application June 6, 1950, Serial No. 166,370

11 Claims. (Cl. 76—37)

This invention relates to apparatus and a method of grinding the cutting edges of the teeth of chain saws or other saws having a similar tooth form.

The present invention relates particularly to grinding the teeth of chain saws of the type wherein the edge tooth is in the form of an arcuate chisel lying generally along the line of travel of the saw chain. In such chain saws the teeth must be ground with an arcuately extending chisel edge, and this is usually accomplished by the use of a circular file of a diameter suited to restoring the preferred arcuate curvature of the tooth cutting edge.

Power means for sharpening such teeth by the use of grinding wheels have previously been proposed, but such means have generally required the use of specially formed grinding wheels whose peripheral edges are rounded to generally simulate the desired arcuate curvature of the tooth edge. Of course, form grinding wheels of this nature do not retain their initial form for any great length of time and the diameters of such wheels are generally such as to present difficulty in properly attacking the cutting edges of the teeth of the chain saw without interference.

The apparatus of the present invention comprises generally a cylindrical grinder of a diameter generally corresponding to the radius of curvature of the cutting edges of the saw teeth and preferably of substantial axial extent, the peripheral face of the cylindrical grinding element being flat and not specially formed. The grinder is so arranged that it may be quickly set at the proper elevation and with its axis at horizontal and vertical angles which vary in chain saw teeth of this general class, but which, in any event, are specified by the manufacturers of the chain saws. The actual grinding is effected by moving the grinding wheel along its axis of rotation toward and into engagement with the cutting edge.

Quick acting clamp means are provided so that a chain of indefinite length may be properly clamped in position to grind a given tooth and then quickly released and reclamped with a succeeding tooth in position to be ground.

Various modifications may be made in the apparatus without departing from the general principles of the invention, but a single specific embodiment is illustrated in the drawings and described in detail in the following specification by way of example. It is to be understood, however, that the principles of the invention are not limited to the particular mechanical embodiment illustrated and described, and that the scope of the invention is limited only as defined in the appended claims.

In the drawings:

Fig. 2 is a cross-sectional view on the line II—II of Fig. 1;

Fig. 3 is a fragmentary cross-sectional view on the line III—III of Fig. 2 but on a somewhat larger scale;

Fig. 4 is a fragmentary perspective view of the clamping portion of the apparatus showing certain indexing and gauging elements;

Fig. 5 is a fragmentary end view of the apparatus partly in cross-section and showing the indicating graduations for the vertical angular adjustment of the grinding element; and Fig. 6 is a fragmentary end view, partly in cross-section, of the grinder motor element of the apparatus.

Figure 1:
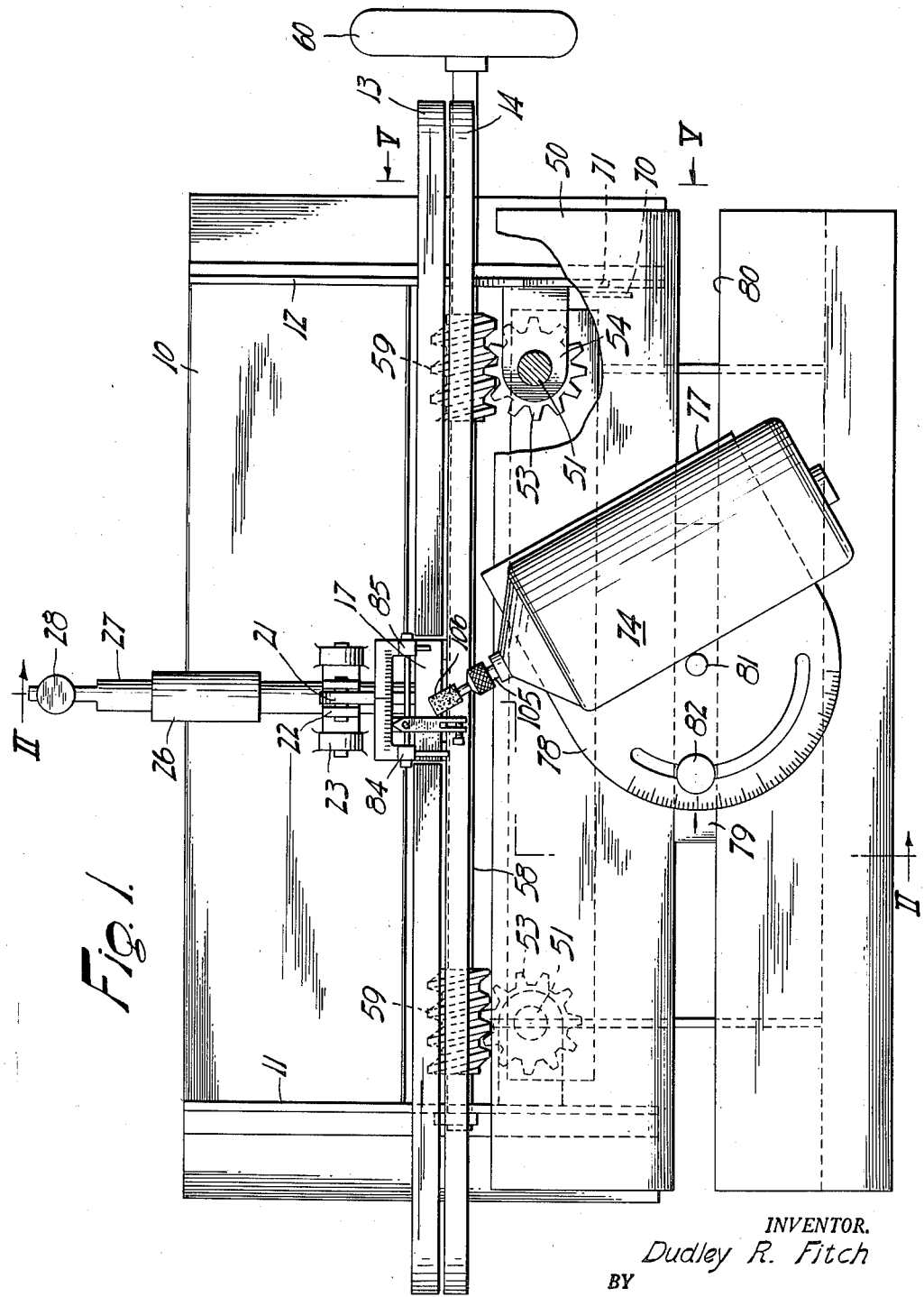
Fig. 1 is a general top plan view of one form of the apparatus of the present invention.

Like characters of reference denote like parts throughout the several figures of the drawings, and the numeral 10 designates generally a base element having opposed vertical end walls 11 and 12 fixed thereto.

Rigidly attached to the upper portions of end walls 11 and 12 are a pair of longitudinal guide rails 13 and 14 which are spaced laterally a distance sufficient to slidably receive the lower sprocket-engaging tooth portions of a chain saw. The opposite upper corners of rails 13 and 14 are smoothly rounded as indicated by the shading in Fig. 1, so that a chain saw may be freely drawn along the tops of rails 13 and 14 in the course of positioning the same for grinding.

Rail 13 is interrupted at its mid-point to accommodate a movable clamp plate 17 which is pivoted to the lower edge of rail 14 by means of lugs 18 as shown in Fig. 2 and clamp plate 17 cooperates with rail 14 to securely clamp the immediate portion of a chain saw that is being ground in the apparatus. Referring particularly to Fig. 2, clamp plate 17 has a depending arm portion 20 which is pivotally connected at one end of a link 21 whose other end is pivoted to the top portion of a generally vertical bifurcated lever 22. Lever 22 is medially pivoted to base 10 as at 23 and is oscillatable to clamp and unclamp plate 17.

A bearing 26 is fixed to the top of base 10 and receives a rock shaft 27. An operating lever 28 is pivoted near its lower end to rock shaft 27 as at 30 and is also pivoted at its lower end to one end of a ratchet bar 32 as at 33. The opposite end of rock shaft 27 has a fixed depending arm 34, the lower end of which engages about and supports the opposite end of ratchet bar 32. This arrangement provides for bodily oscillation of ratchet bar 32 about the axis of rock shaft 27 by pivotal manipulation of operating lever 28 in bearing 26 as indicated by the full-line and dot-and-dash line showings in Fig. 3.

A compression coil spring 40, which is disposed about ratchet bar 32 seats at one end against a transverse pin 41 fixed to ratchet bar 32, and at its other end against a transverse pin 43, which rides in a longitudinal slot in ratchet bar 32. In the position shown in Fig. 2 and in the full-line position of Fig. 3 the teeth of ratchet bar 32 engage a locking wedge or knife formation at the upper edge of an arm 45, which is pivoted to base 10 as at 46 in Fig. 3. The free end of arm 45 is urged resiliently upwardly by an extension coil spring 47, which is fixed at its lower end to arm 45 and at its upper end to a base 10.

If the upper end of operating lever 28 be pulled to the left, as viewed in Fig. 2, ratchet bar 32 moves to the right as there shown, and lever 22 is urged in a counterclockwise direction on its pivot 23 by the yieldable resilient spring force imparted thereto by engagement of transverse pin 43. The degree of clamping pressure is thus variable, depending on the manual force applied to operating lever 28. When a suitable clamping force has been applied and the operator removes his hand from lever 28, the teeth of ratchet bar 32 in cooperation with the knife formation on arm 45 prevent retrograde unclamping movement.

However, when it is desired to unclamp the chain saw, an operator merely swings operating lever 28 about the axis of rock shaft 27, as indicated by the dot-and-dash line showing in Fig. 3, whereupon the teeth of ratchet bar 32 leave the knife formation of arm 45 and clamping pressure is removed. The teeth of the ratchet bar are of less pitch than the thickness of arm 45, so that they do not impede retrograde movement of the ratchet bar when the parts are in the dot-and-dash line position of Fig. 3.

The support for the grinding means of the apparatus comprises a table 50, which is mounted for bodily adjustment in a vertical direction and also for pivotal adjustment about a horizontal axis generally parallel to the extent of the chain saw to be operated upon. The opposite ends of table 50 are pivoted at one longitudinal edge of the table to the upper ends of a pair of screws 51, as at 52 in Fig. 2. Screws 51 thread through worm wheels 53, and the latter, including their end hub portions, are restrained against axial movement by being disposed between vertically spaced pairs of lugs 54 and 55 fixed to walls 11 and 12.

A shaft 58 is journaled at its opposite ends in the side walls 11 and 12 and has fixed thereto a pair of worms 59 for rotating worm wheels 53 upon rotation of shaft 58. A hand wheel 60 is fixed to an outwardly projecting end of shaft 58.

The lower ends of each of the screws 51 has a reduced portion 62 which has bearing in a bar 63 and is held against vertical axial movement in such bars by cotter pins or the like as at 64 and 65. A pair of tie rods 67 and 68 are pivotally attached to bar 63 and the opposite longitudinal edge of table 50, respectively, and are connected by a turnbuckle 69 to readily adjust the effective distance between the pivots of the tie rod elements, such adjustment controlling the angular disposition of table 50.

Fig. 5 shows a protractor 70 fixed to the under side of table 50, and a pointer 71 which is fixed relative to the side frames 11 and 12, whereby the angle of elevation of the table may readily be read. The tie rod assembly 67, 68, and 69 is preferably disposed substantially centrally between the screws 51, considered lengthwise of table 50, and, since there is only the single turn buckle 69, there is no problem of synchronizing angular adjustment of table 50.

From the foregoing it will be seen that manipulation of hand wheel 60 raises and lowers the pair of screws 51 synchronously and thus raises both longitudinal edges of table 50 synchronously without affecting the angular adjustment as established by turnbuckle 70, since the lower tie rod 67 is pivoted to bar 63 which is adjusted vertically jointly with pivots 52 at the upper ends of screws 51.

An electric driving motor is designated 74 in Figs. 1, 2 and 6, and, as shown in the latter view, is provided with a base portion having a longitudinal groove 75, which fits over a complementary rib 76, which is formed on a supporting plate element 77. Referring to Fig. 1, plate element 77 has a semi-circular protractor portion 78, which extends laterally beyond motor 74 and is pivoted to an underlying guide bar 79, which is longitudinally slidable in a continuous groove 80, which extends lengthwise of table portion 50.

As shown in Fig. 1, protractor portion 78 is pivoted to guide bar 79 at the center or axis from which the protractor graduations radiate, as indicated at 81. Angular adjustment of plate element 77 on table 50 is established by thumb screw 82 which passes through an arcuate slot in the protractor and threads into guide bar 79. Motor 74 may be manipulated vertically independently of plate 77 by releasing a thumb screw designated 83 in Fig. 6.

Means are provided for readily indexing successive teeth and for gauging the relative sizes of successive teeth as to length in the direction of extension of the chain saw. Such means are indicated generally in Figs. 1 and 2 and are shown in greater detail and on an enlarged scale in the perspective view, Fig. 4.

A pair of uprights 84 and 85 are fixed to the rear of clamp plate 17, and a pair of pins 86 and 87 project slidably therethrough in a direction at right angles to the chain saw. The pins 86 and 87 may be slid forwardly and rearwardly by releasing thumb screws 88 and 89. In the illustrated position pin 86 is engaging the rear vertical edge of a saw tooth to properly locate the front or cutting edge of the tooth relative to the grinding wheel.

Ordinarily this indexing is sufficient to properly locate successive teeth facing in the same direction. When clamp plate 17 is swung rearwardly to unclamp the chain saw, pin 86 automatically is moved back out of the way to permit another tooth to be brought into approximately correct registry. The operator grinds every other tooth of the chain saw since they are all duplicates. Then, he reverses the chain saw and grinds the intervening teeth which face oppositely. When he makes this reversal, pin 86 is released and pushed rearwardly out of the way, and pin 87 is released and moved forwardly into indexing position.

The mechanism carried at the top of uprights 86 and 85 provide indicating means for determining the relative lengths of successive teeth. A rock shaft 90 is journaled at opposite sides in uprights 84 and 85 and may be provided with a manipulating knob 91. A forwardly projecting bifurcated arm 92 is normally secured to rock shaft 90 by means of a set screw 93 but may be adjusted therealong. A graduated plate 95 fixed to the rear faces of uprights 84 and 85 may be employed in gauging the setting of arm 92 along rock shaft 90. A gauge pin 97 is normally locked in the bifurcation 92 by a clamp screw 98 but may be adjusted both forwardly and rearwardly and vertically relative to arm 92.

Arm 92 and pin 97 occupy the position illustrated in Figs. 1, 2, and 4 only during an actual gauging operation and are preferably normally swung rearwardly through an angle of 90° or more to be out of the way during the actual grinding operation.

In the illustrated instance the drive shaft of motor 74 is designated 105 and has fixed thereto a grinding wheel 106 of a diameter of three-eighths of an inch which, because of the vertical obliquity of the motor shaft axis, will produce a cutting edge of somewhat broader curvature than the curvature of the periphery of the wheel. This, of course, is merely one example of wheel size and angularity of adjustment.

What is claimed is:

1. Chain saw grinding apparatus comprising a pair of parallel longitudinal guide bars, releasable clamp means for securing a chain saw between said guide bars, a motor table adjacent to the guide bars, means pivoting said table about an axis parallel to the guide bars at the edge of said table toward the guide bars and for securing the table in adjusted angular position relative to the pivoting means, means mounting the table, the pivoting means and said securing means for joint bodily vertical adjustment, a motor having a grinding wheel secured to its drive shaft, and means guiding said motor for lineal sliding movement on said table, said guide means being adjustable bodily along said table in a longitudinal direction and angularly in the plane of said table.

2. Chain saw grinding apparatus comprising a pair of parallel longitudinal guide bars, releasable clamp means for securing a chain saw between said guide bars with its cutting tooth portions projecting thereabove, a motor table adjacent to the guide bars, means pivoting said table about an axis parallel to and relatively close to the guide bars and for securing the table in adjusted angular position relative to the pivoting means, means for bodily vertical adjustment of said table, a motor having a grinding wheel secured to its drive shaft, and means guiding said motor for lineal sliding movement on said table, said guide means being adjustable bodily along said table in a longitudinal direction and angularly in the plane of said table.

3. Chain saw grinding apparatus comprising a pair of parallel longitudinal guide bars forming a groove for receiving the thin tooth engaging portions of a chain saw with the link portions thereof resting on said guide bars, releasable clamp means for securing a chain saw between said guide bars with its cutting tooth portions projecting thereabove, a motor table adjacent to the guide bars, means pivoting said table about an axis parallel to and relatively close to the guide bars and for securing the table in adjusted angular position relative to the pivoting means, means mounting the table, the pivoting means and said securing means for joint bodily vertical adjustment, a motor having a grinding wheel secured to its drive shaft, and means guiding said motor for lineal sliding movement on said table, said guide means being adjustable bodily along said table in a longitudinal direction and angularly in the plane of said table.

4. Chain saw grinding apparatus comprising a pair of parallel longitudinal guide bars, releasable clamp means for securing a chain saw between said guide bars with its cutting tooth portions projecting thereabove, a motor table adjacent to the guide bars, means pivoting said table about an axis parallel to and relatively close to the guide bars and for securing the table in adjusted angular position relative to the pivoting means, means mounting the table, the pivoting means and said securing means for joint bodily vertical adjustment, a motor having a grinding wheel secured to its drive shaft, and means guiding said motor for lineal sliding movement on said table.

5. Chain saw grinding apparatus comprising a pair of parallel longitudinal guide bars, releasable clamp means medially of said guide bars for securing a chain saw tooth between said guide bars with its cutting tooth portion projecting thereabove, a motor table adjacent to the guide bars, means pivoting said table about an axis parallel to the guide bars and for securing the table in adjusted angular position relative to the pivoting means, means mounting the table, the pivoting means and said securing means for joint bodily vertical adjustment, a motor having a grinding wheel secured to its drive shaft, and means guiding said motor for lineal sliding movement on said table, said guide means being adjustable bodily along said table in a longitudinal direction and angularly in the plane of said table.

6. Chain saw grinding apparatus comprising a pair of spaced parallel longitudinal guide bars, one of said guide bars being medially interrupted to receive a releasable clamp plate for clamping the medial portion of a chain saw against the other guide bars with its cutting tooth portions projecting thereabove, a motor table adjacent to the guide bars, means pivoting said table about an axis parallel to and relatively close to the guide bars and for securing the table in adjusted angular position relative to the pivoting means, means mounting the table, the pivoting means and said securing means for joint bodily vertical adjustment, a motor having a grinding wheel secured to its drive shaft, and means guiding said motor for lineal sliding movement on said table, said guide means being adjustable bodily along said table in a longitudinal direction and angularly in the plane of said table.

7. Chain saw grinding apparatus comprising a pair of parallel longitudinal guide bars, releasable clamp means for securing a chain saw between said guide bars with its cutting tooth portion projecting thereabove, a table adjacent to the guide bars, means pivoting said table about an axis parallel to and relatively close to the guide bars and for securing the table in adjusted angular position relative to the pivoting means, means mounting the table, the pivoting means and said securing means for joint bodily vertical adjustment, means including a grinding wheel, and means guiding said grinding wheel means for lineal sliding movement on said table in a direction parallel to the axis of the grinding wheel, said guide means being adjustable bodily along said table in a longitudinal direction and angularly in the plane of said table.

8. Chain saw grinding apparatus comprising a pair of parallel longitudinal guide bars, releasable clamp means for securing a chain saw between said guide bars with its cutting tooth portions projecting thereabove, a table adjacent to the guide bars, means pivoting said table about an axis parallel to the guide bars and for securing the table in adjusted angular position relative to the pivoting means, means mounting the table for bodily vertical adjustment, means including a grinding wheel, and means guiding said grinding wheel means for lineal sliding movement on said table in a direction parallel to the axis of the grinding wheel, said guide means being adjustable bodily along said table in a longitudinal direction and angularly in the plane of said table.

9. Chain saw grinding apparatus comprising a pair of parallel longitudinal guide bars, releasable clamp means for securing a chain saw between said guide bars with its cutting tooth portions projecting thereabove, a table adjacent to the guide bars, means pivoting said table about an axis parallel to the guide bars and for securing the table in adjusted angular position relative to the pivoting means, means mounting the table, and pivoting means and said securing means for joint bodily vertical adjustment, means including a grinding wheel, and means guiding said grinding wheel means for lineal sliding movements on said table in a direction parallel to the axis of the grinding wheel, said guide means being adjustable bodily along said table in a longitudinal direction and angularly in the plane of said table.

10. Chain saw grinding apparatus for chain saw teeth having generally arcuate cutting edges comprising a longitudinal support including releasable clamp means for securing a chain saw tooth with its cutting tooth portion projecting thereabove, a table adjacent to the longitudinal support, means pivoting said table about an axis parallel to and relatively close to the longitudinal support and for securing the table in adjusted angular position relative to the pivoting means, means mounting the table, the pivoting means and said securing means for joint bodily vertical adjustment relative to the longitudinal support, means including a grinding wheel of relatively small diameter and having a flat periphery, and means guiding said grinding wheel means for lineal sliding movement on said table to move said grinding wheel axially toward the saw tooth and engage the periphery of said wheel against the cutting edge of the tooth, said guide means being adjustable bodily along said table in a longitudinal direction and angularly in the plane of said table.

11. Chain saw grinding apparatus for chain saw teeth having generally arcuate cutting edges comprising a longitudinal support including releasable clamp means for securing a chain saw tooth with its cutting tooth portion projecting thereabove, a table adjacent to the longitudinal support, means pivoting said table about an axis parallel to the longitudinal support and for securing the table in adjusted angular position relative to the pivoting means, means mounting the table for bodily vertical adjustment relative to the longitudinal support, a motor having a grinding wheel of relatively small diameter and having a flat periphery secured to its drive shaft, and means guiding said motor for lineal sliding movement on said table to move said grinding wheel axially toward the sawtooth and engage the periphery of said wheel against the cutting edge of the tooth, said guide means being adjustable bodily along said table in a longitudinal direction and angularly in the plane of said table.

DUDLEY R. FITCH.

REFERENCES CITED

The following references are of record in the file of this patent:

UNITED STATES PATENTS

| Number | Name | Date |
| --- | --- | --- |
| 2,195,108 | Graff | Mar. 26, 1940 |
| 2,329,879 | Christy et al. | Sept. 21, 1943 |
| 2,427,754 | Wahlstrom | Sept. 23, 1947 |
| 2,453,638 | Nietfeld | Nov. 9, 1948 |
| 2,462,225 | Roderick | Feb. 22, 1949 |
| 2,518,018 | Jung | Aug. 8, 1950 |

FOREIGN PATENTS

| Number | Country | Date |
| --- | --- | --- |
| 670,747 | Germany | Jan. 26, 1939 |